(12) United States Patent
Notermans et al.

(10) Patent No.: US 9,459,445 B1
(45) Date of Patent: Oct. 4, 2016

(54) DUAL GATE PIXEL RESET FOR A DISPLAY DEVICE

(71) Applicant: Amazon Technologies, Inc., Reno, NV (US)

(72) Inventors: Peter Theresia Leonard Maria Notermans, Urmond (NL); Toru Sakai, Waalre (NL); Johannes Wilhelmus Hendrikus Mennen, Budel (NL); Pavel Novoselov, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 14/230,978

(22) Filed: Mar. 31, 2014

(51) Int. Cl.
*G02B 26/00* (2006.01)
*G02B 26/02* (2006.01)
*G09G 3/34* (2006.01)

(52) U.S. Cl.
CPC ............ *G02B 26/005* (2013.01); *G09G 3/348* (2013.01); *G02B 26/004* (2013.01); *G02B 26/02* (2013.01); *G09G 2300/0426* (2013.01); *G09G 2300/0439* (2013.01); *G09G 2300/0842* (2013.01); *G09G 2310/061* (2013.01)

(58) Field of Classification Search
CPC .. G02B 26/00; G02B 26/004; G02B 26/005; G02B 26/02; G09G 3/348; G09G 3/3446; G09G 2300/0426; G09G 2300/0439; G09G 2300/0842; G09G 2310/061; G09G 2310/062; G09G 2320/0238; G09G 5/00
USPC ....... 359/290, 291, 295, 245, 228, 665, 666; 345/55, 84, 204, 212; 204/450, 547, 204/600, 643; 374/112, 166, 178
See application file for complete search history.

(56) References Cited

U.S. PATENT DOCUMENTS

| | | | | |
|---|---|---|---|---|
| 6,069,600 A | | 5/2000 | Saishu et al. | |
| 7,230,597 B2 * | | 6/2007 | Edwards | G09G 3/2011 345/55 |
| 8,482,496 B2 * | | 7/2013 | Lewis | G09G 3/3433 345/84 |
| 8,519,923 B2 * | | 8/2013 | Hagood, IV | G02B 26/02 345/55 |
| 8,519,945 B2 * | | 8/2013 | Hagood | G09G 3/346 345/108 |
| 8,587,580 B2 * | | 11/2013 | Kim | G09G 3/3413 345/212 |
| 8,928,645 B2 * | | 1/2015 | Miyake | G09G 3/3614 345/209 |
| 9,064,463 B2 * | | 6/2015 | Jung | G09G 3/348 |
| 9,087,486 B2 * | | 7/2015 | Gandhi | G02B 26/001 |
| 9,158,106 B2 * | | 10/2015 | Hagood | G02B 26/02 |
| 9,177,523 B2 * | | 11/2015 | Hagood | G09G 3/346 |
| 2013/0257914 A1 | | 10/2013 | Jung et al. | |
| 2014/0139507 A1 * | | 5/2014 | Jung | G09G 3/348 345/212 |
| 2014/0152641 A1 * | | 6/2014 | Yun | G09G 3/348 345/212 |

FOREIGN PATENT DOCUMENTS

WO WO2008119774 A1 10/2008

\* cited by examiner

Primary Examiner — Loha Ben

(74) Attorney, Agent, or Firm — Lee & Hayes, PLLC

(57) ABSTRACT

Electrowetting elements of a display device include a support plate, a bottom electrode, electrowetting oil and an electrolyte on the bottom electrode. The electrowetting oil is immiscible with the electrolyte, a top electrode is in electrical contact with the electrolyte, and the bottom electrode, the top electrode and the electrolyte form a portion of a circuit. The electrowetting elements each further include a first thin film transistor (TFT) that is switched on to select each of the electrowetting elements using active matrix addressing, and a second TFT that is switched on to provide a reset pulse to the portion of the circuit. The reset pulse can be used to reduce or eliminate backflow of the electrowetting oil.

15 Claims, 5 Drawing Sheets

DUAL GATE PIXEL RESET FOR A DISPLAY DEVICE

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect a user's experience with the electronic device and the content presented thereon. Accordingly, finding ways to enhance user experience and satisfaction continues to be a priority. Moreover, increased multimedia use imposes high demands on designs and operations of display devices, as content available for mobile use becomes visually richer.

Electronic displays generally include an array of transmissive or reflective pixels configured to be operated by an active matrix addressing scheme. For example, rows and columns of pixels are operated by controlling voltage levels on a plurality of source lines and gate lines.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Overview

Figure 1:
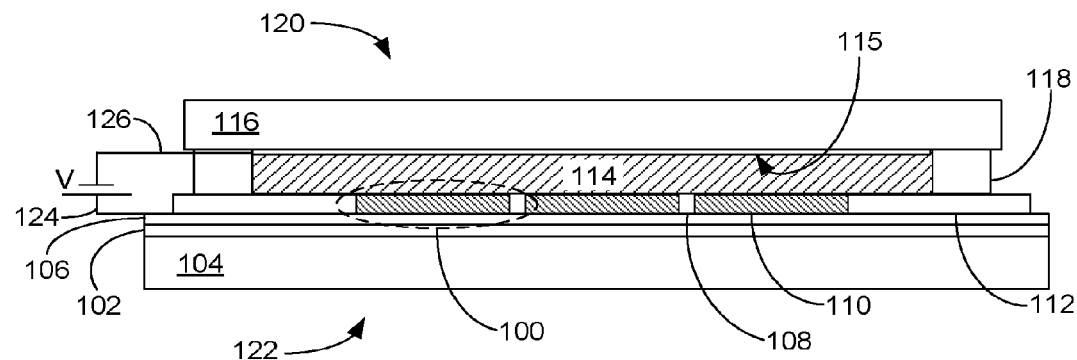
FIG. 1 is a cross-section of an electrowetting device, according to some embodiments.

In various embodiments described herein, electronic devices include displays for presenting content and other information. In some examples, the electronic devices may also include one or more additional components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like. Various embodiments described herein also include techniques for assembling electronic devices including these component stacks for the displays and other features described herein.

A display device, such as an electrowetting display device, for example, can be a thin film transistor electrowetting display (TFT-EWD) that generally includes an array of transmissive or reflective electrowetting elements (e.g., pixels or subpixels) configured to be operated by an active matrix addressing scheme. For example, rows and columns of electrowetting elements are operated by controlling voltage levels on a plurality of source lines and gate lines. In this fashion, the display device can produce an image by selecting particular electrowetting elements to transmit, reflect or block light. Electrowetting elements are addressed (e.g., selected) via rows and columns of the source lines and gate lines that are electrically connected to transistors (e.g., used as switches) included in each electrowetting element. Transistors take up a relatively small fraction of the area of each electrowetting element to allow light to easily pass through (or reflect from) the electrowetting element. Herein, an electrowetting element may comprise a pixel or subpixel, which may be the smallest light transmissive element of a display that is individually operable to directly control an amount of light transmission or reflection through the element. For example, in some implementations, an electrowetting element may be a pixel that includes a red subpixel, a green subpixel, and a blue subpixel. In other implementations, an electrowetting element may be a pixel that is a smallest component, e.g., the pixel does not include any subpixels.

In various embodiments, an electrowetting element of an electrowetting display device includes, among other things, an electrode layer and a first thin film transistor (TFT) that is switched to either select or deselect the electrowetting element using active matrix addressing. A TFT is a particular type of field-effect transistor that includes thin films of an active semiconductor layer as well as a dielectric layer and metallic contacts over a supporting (but non-conducting) substrate, which may be glass or other transparent materials, for example.

The electrowetting element also includes a second TFT that is switched on to provide a reset pulse to the electrode layer. Such a reset pulse may be applied to individual electrowetting elements to reduce adverse effects on the quality (e.g., brightness, contrast ratio, and so on) of a displayed image resulting from electrowetting fluid backflow. For example, such backflow can reduce the stability of a display state during a display period which, for example, is the period during which a desired first display state is to be maintained. Here, the first display state corresponds to a first fluid (e.g., electrowetting oil) being contracted or partially contracted to allow light transmit through (or reflect from) the electrowetting element. Even though a first signal level corresponding to the first display state is applied to the electrowetting element during this period, the contracted or partially contracted first fluid tends to flow back to form a layer over the electrode layer, as in the case of an inactive state that prevents light from transmitting through (or reflecting from) the electrowetting element. The rate of backflow depends, at least in part, on the properties of the first fluid. Backflow leads to an undesirable change in the display state of the electrowetting element and, consequently, a reduced quality of the image of the display device.

The application of a reset pulse during the display period of the first display state resets the electrowetting element to counteract backflow. Since the reset pulse may affect the instantaneous display state of an electrowetting element, the duration of the reset pulse is relatively short compared to the duration of the first signal level corresponding to the first display state.

Though a reset pulse can benefit the performance of an electrowetting display device, electrical lines (e.g., conductive traces of a semiconductor circuit) that provide reset pulses to electrowetting elements may capacitively couple with source lines when the electrical lines physically cross the source lines. Such capacitive coupling leads to loss of power in the electrowetting display device. To make matters worse, an electrowetting display device using active matrix addressing may have thousands of occurrences where reset pulse electrical lines physically cross the source lines.

Capacitive coupling between two elements depends, at least in part, on frequency and/or voltage swing (e.g., magnitude) of electrical signals on one or both of the elements. Thus, capacitive coupling between the two elements can be reduced by reducing the frequency and/or voltage swing of either or both of the two elements.

In various embodiments, an electrowetting display device is configured to provide reset pulses to individual electrowetting elements in a way that reduces capacitive coupling at crossings between source lines and reset pulse electrical lines. As mentioned above, an electrowetting element of an electrowetting display device includes a first TFT that is switched to either select or deselect the electrowetting element and a second TFT that is switched on to provide a reset pulse to the electrode layer. The second TFT is gated by reset gate lines that also cross source lines, but voltage on the reset gate lines is relatively small compared to voltage of a reset pulse. Accordingly, capacitive coupling at crossings between reset gate lines (e.g., carrying about 5 volts) and source lines is relatively small compared to capacitive coupling at crossings between reset pulse lines (e.g., carrying about 20 volts) and source lines. Moreover, in some embodiments, reset pulse lines may carry a substantially constant voltage so that capacitive coupling at crossings between such reset pulse lines and source lines is eliminated.

Illustrative Environment

FIG. 1 is a cross-section of a portion of an electrowetting device showing several electrowetting elements 100, according to some embodiments. An electrode layer 102 is formed on a bottom support plate 104. In some implementations, a dielectric barrier layer (not shown) may at least partially separate electrode layer 102 from a hydrophobic layer 106 also formed on bottom support plate 104. Such separation can, among other things, prevent electrolysis occurring through the hydrophobic layer 106. In some implementations, hydrophobic layer 106 can comprise a fluoropolymer, such as AF1600, produced by DuPont, based in Wilmington, Del. Hydrophobic layer 106 can also be any of a number of water-repelling materials that affect wettability of an adjacent material, for example. Pixel walls 108 form a patterned electrowetting element grid on hydrophobic layer 106. Pixel walls 108 may comprise a photoresist material, such as epoxy-based negative photoresist SU-8. The patterned electrowetting element grid comprises rows and columns that form an electrowetting element array (e.g., display area) of field electrowetting elements and border electrowetting elements. For example, an electrowetting element can have a width and length in a range of about 50 to 500 microns. A first fluid 110, which can have a thickness in a range of about 1 to 10 microns, for example, overlies hydrophobic layer 106. First fluid 110 is partitioned by pixel walls 108 of the patterned electrowetting element grid. An outer rim 112 can comprise the same material as pixel walls 108. A second fluid 114, such as an electrolyte, overlies oil film 110 and pixel walls 108 of the patterned electrowetting element grid. An electrolyte can be electrically conductive or polar. For example, an electrolyte may be, among other things, water or a salt solution such as potassium chloride water.

A top support plate 116 covers second fluid 114 and edge seals 118 retain second fluid 114 over the electrowetting element array. The bottom support plate and the top support plate may be separate parts of individual electrowetting elements or the bottom support plate and the top support plate may be shared by a plurality of electrowetting elements. The bottom support plate and the top support plate may be made of glass or polymer and may be rigid or flexible, for example.

A voltage V applied across the second fluid 114 and the dielectric barrier layer stack (e.g., comprising, hydrophobic layer 106, and optionally a barrier layer (not shown)) of individual electrowetting elements can control transmittance or reflectance of the individual electrowetting elements.

The display device has a viewing side 120 on which an image formed by the electrowetting display device can be viewed, and a rear side 122. Top support plate 116 faces viewing side 120 and bottom support plate 104 faces rear side 122. In an alternative embodiment, the electrowetting display device may be viewed from rear side 122. The electrowetting display device may be a reflective, transmissive or transflective type. The electrowetting display device may be a segmented display type in which the image is built up of segments. The segments can be switched simultaneously or separately. Each segment includes one electrowetting element 100 or a number of electrowetting elements 100 that may be neighboring or distant from one another. Electrowetting elements 100 included in one segment are switched simultaneously, for example. The electrowetting display device may also be an active matrix driven display type or a passive matrix driven display, just to name a few examples.

Second fluid 114 is immiscible with first fluid 110. Herein, substances are immiscible with one another if the substances do not substantially form a solution. Second fluid 114 is electrically conductive or polar, and may be water or a salt solution such as a solution of potassium chloride in a mixture of water and ethyl alcohol, for example. Second fluid 114 is preferably transparent, but may be colored, white, absorbing or reflecting. First fluid 110 is electrically non-conductive and may for instance be an alkane like hexadecane or (silicone) oil. Hydrophobic layer 106 is arranged on bottom support plate 104 to create an electrowetting surface area. The hydrophobic character causes first fluid 110 to adhere preferentially to bottom support plate 104 since first fluid 110 has a higher wettability with respect to the surface of hydrophobic layer 106 than second fluid 114. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

Electrode layer 102 is separated from first fluid 110 and second fluid 114 by an insulator, which may be hydrophobic layer 106. Electrode layer 102 is supplied with voltage signals V by a first signal line 124. A second signal line 126 is electrically connected to an electrode 115 which is in contact with the conductive second fluid 114. Electrode 115 may be common to more than one electrowetting element since they are fluidly interconnected by and share second fluid 114 uninterrupted by pixel walls 108. Electrowetting elements 100 are controlled by the voltage V applied between the first and second signal lines 124 and 126. Electrode layer 102 may be electrically connected to a display driving controller, for example, by a matrix of printed wiring on bottom support plate 104.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or reflective. A reflective layer may reflect the entire visible spectrum, making the layer appear white, or part of it, making it have a color.

When the voltage V applied between the signal lines 124 and 126 is set at a non-zero active signal level, electrowetting element 100 will enter into an active state. Electrostatic forces will move second fluid 114 toward electrode layer 102, thereby repelling first fluid 110 from the area of hydrophobic layer 106 to pixel walls 108 surrounding the area of hydrophobic layer 106, to a droplet-like form. This action uncovers first fluid 110 from the surface of hydrophobic layer 106 of electrowetting element 100. When the voltage across electrowetting element 100 is returned to an in-active signal level of zero or a value near to zero, electrowetting element 100 will return to an inactive state, where first fluid 110 flows back to cover hydrophobic layer 106. In this way, first fluid 110 forms an electrically controllable optical switch in each electrowetting element 100.

Figure 2:
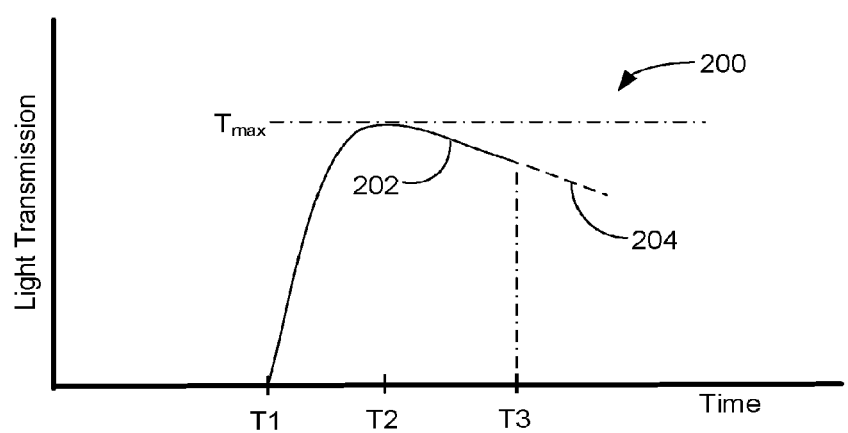
FIG. 2 is a plot of light transmission of an electrowetting element as a function of time, according to various embodiments.

FIG. 2 is a plot 200 of light transmission of electrowetting element 100 as a function of time, according to various embodiments. Though transmission is discussed, electrowetting element 100 may be incorporated in a transmissive or reflective type of electrowetting display. Here, transmission refers to the amount of light that arrives at hydrophobic layer 106, wherein the light may subsequently be reflected from a layer underlying hydrophobic layer 106 or may be transmitted through the underlying layers and bottom support plate 104, for example.

Figure 3:
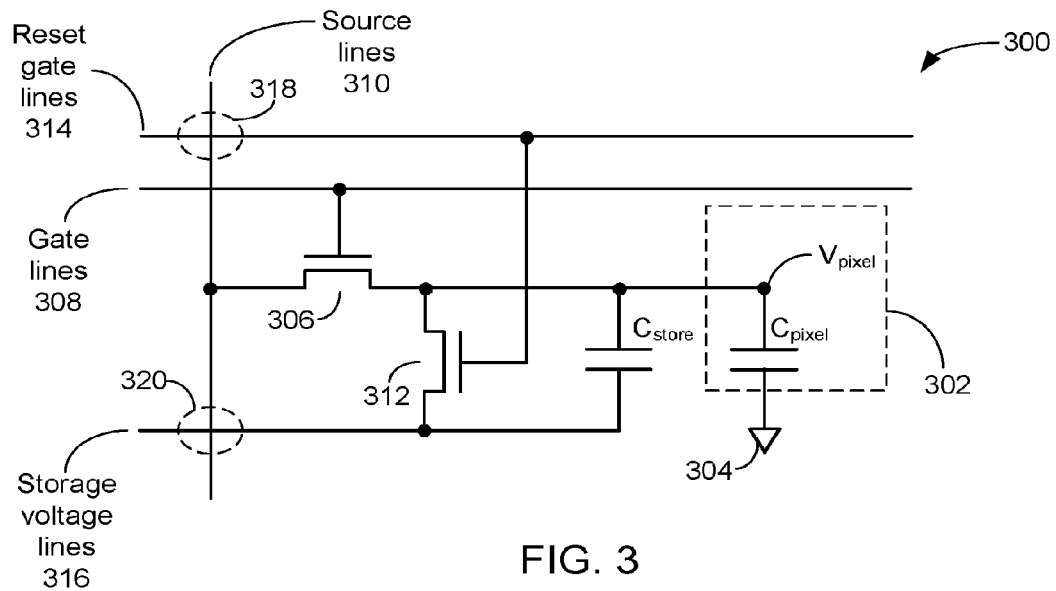
FIG. 3 is a schematic circuit diagram of a circuit of an electrowetting element, according to various embodiments.

Plot 200 demonstrates how backflow of first fluid 110 can affect light transmission through electrowetting element 100. In a first display period, before time T1, a voltage V applied between signal lines 124 and 126 is zero, electrowetting element 100 is in an inactive state, and the light transmission is zero. At time T1, a voltage V applied between signal lines 124 and 126 is set at a non-zero active signal level so that electrowetting element 100 will enter into an active state. For example, voltage V may be the voltage of the drain of a data TFT 306, as shown in FIG. 3. Electrostatic forces move second fluid 114 toward electrode layer 102 and first fluid 110 is consequently repelled from the area of hydrophobic layer 106 to pixel walls 108 surrounding the area of hydrophobic layer 106, to a droplet-like form. Thus, first fluid 110 uncovers the surface of hydrophobic layer 106 and light transmission rapidly increases to a transmission level $T_{max}$ at time T2.

During or after the application of voltage V, first fluid 110 will gradually flow back to increasingly cover hydrophobic layer 106, thereby reducing light transmission of electrowetting element 100. The decrease in light transmission due to backflow is indicated by the down-slope portion 202 in plot 200. Portion 202, and thus light transmission, continues to decrease over time. At time T3, a reset pulse is applied to counteract the effects of backflow. The reset pulse momentarily suspends backflow and induces first fluid motion over the pixel area. After the reset pulse, the data voltage for a corresponding grey level can be applied to the pixel for the duration of the display period. Reset pulses are sufficiently short so as not to produce flicker for an observer of the image of the electrowetting display. Subsequently, light transmission may increase back to $T_{max}$.

In contrast, without the reset pulse the transmission of the element would have followed the slanting dashed line 204. Although effects of a reset pulse is explained with reference to an electrowetting element operating in transmission, a similar explanation can be given for an electrowetting element operating in reflection, whereby the display state of the element is not represented by transmission but by reflection.

In some particular embodiments, the duration of a reset pulse may be about 1 millisecond, and the duration of a display period may be about 20 milliseconds. A reset pulse can reduce effects of backflow to such an extent that an observer need not perceive these effects. As mentioned above, reset pulses are sufficiently short so as not to produce flicker for an observer of the image of the electrowetting display.

FIG. 3 is a schematic circuit diagram of a circuit of an electrowetting element 300 of a display device, according to various embodiments. Circuit 300 includes a pixel portion 302 that includes the optical portion of electrowetting element 300. Here, referring to the example embodiment shown in FIG. 1, for example, such an optical portion includes first and second fluids 110 and 114 and portions of first and second signal lines 124 and 126. An electrical representation of the optical portion is shown in pixel portion 302. For example, capacitance Cpixel represents a capacitance formed by a multiple dielectric layer stack between two electrodes (e.g., terminations of first and second signal lines 124 and 126) of pixel portion 302. Vpixel is the voltage of pixel portion with respect to common or ground 304. In some implementations, Vpixel is also the voltage of the drain of a data TFT 306, which is used, among other things, to select electrowetting element 300 from an array of rows and columns of such electrowetting elements.

The display device includes rows of gate lines 308 for selecting particular electrowetting elements and columns of source lines 310 for electrically driving the selected electrowetting elements. Gate lines 308 and source lines 310 may comprise metallic or tin-doped indium-oxide (ITO) conductive traces on a support plate (e.g., bottom support plate 104). Gate line 308 is electrically connected to the gate of data TFT 306 to select or deselect electrowetting element 300. Source line 310 is electrically connected to the source of data TFT 306. The drain of TFT 306 is electrically connected to pixel portion 302. In other implementations, different types of TFTs (e.g., n-type or p-type) may be used so that sources and drains may be reversed in the example descriptions herein. Claimed subject matter is not limited in this respect. Also, embodiments are described herein as having rows and columns of conductive lines (e.g., 308 and 310). However, the descriptions may include a switch between "rows" and "columns" without affecting the nature of such descriptions. Claimed subject matter is not limited in this respect.

Electrowetting element 300 includes a reset TFT 312 that selectively applies a reset signal (e.g., an electrical pulse) to pixel portion 302. As discussed above, a reset signal may be provided to an electrowetting element, such as pixel portion 302, to reduce or eliminate effects of backflow of a first fluid. The gate of reset TFT 312 is electrically connected to one of a plurality of reset gate lines 314, the source of reset TFT 312 is electrically connected to one of a plurality of storage voltage lines 316, and the drain of reset TFT 312 is electrically connected to pixel portion 302. A capacitor $C_{store}$ is also electrically connected to one of the plurality of storage voltage lines 316 and pixel portion 302 so as to be electrically in parallel with reset TFT 312.

In some embodiments, a reset signal is provided to pixel portion 302 when reset TFT 312 is switched on to connect the voltage on storage voltage lines 316 to pixel portion 302. In other words, TFT 312 acts as a switch that either electrically connects storage voltage line 316 to pixel portion 302 (e.g., switched "on") or electrically disconnects storage voltage line 316 from pixel portion 302 (e.g., switched "off"). The voltage on the gate of reset TFT 312 determines whether reset TFT 312 is switched on or switched off. For example, to provide a reset signal comprising a square pulse to pixel portion 302, reset gate line 314 provides a square pulse to the gate of reset TFT 312. Consequently, reset TFT 312 will be switched on while the square pulse is present at the gate of reset TFT 312 and will be switched off just before and just after this period. While reset TFT 312 is switched on, the voltage on storage voltage line 316 will be electrically connected to pixel portion 302. This process results in a square pulse reset signal that (at least substantially) mimics the square pulse provided to the gate of reset TFT 312.

As discussed above, though a reset pulse can benefit the performance of an electrowetting display device by reducing or eliminating effects of backflow of a first fluid in electrowetting elements, electrical lines that provide reset pulses to the electrowetting elements may capacitively couple with source lines when the electrical lines physically cross the source lines. Such capacitive coupling leads to loss of power in the electrowetting display device. As explained above, capacitive coupling between two electrical lines depends, at least in part, on frequency and/or voltage swing (e.g., magnitude) of electrical signals on one or both of the electrical lines.

Though storage voltage lines 316 and source lines 310 cross at regions 320, the power consumption due to capacitive coupling between storage voltage lines 316 and source lines 310 is relatively low because the voltage magnitude on storage voltage lines 316 is constant. Capacitor $C_{store}$ adds capacitance to the pixel in order to maintain a voltage level during the period when the gate line or the reset gate line of the corresponding pixel is not active and therefore has a "floating" voltage.

Figure 4:
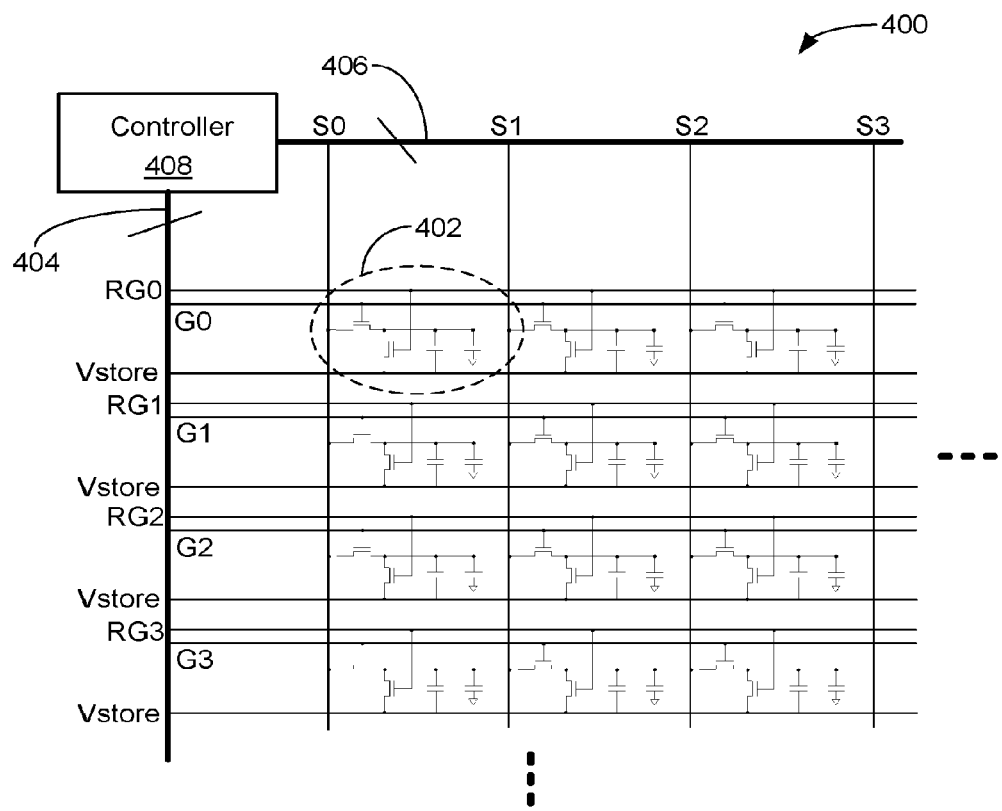
FIG. 4 is a schematic circuit diagram of a portion of an electrowetting element array of an electrowetting device, according to various embodiments.

FIG. 4 is a schematic circuit diagram of a portion of an electrowetting display device 400, according to various embodiments. Electrowetting display device 400 includes a plurality of electrowetting elements 402 arranged in rows and columns of a matrix. For example, electrowetting display device 400 can include hundreds or thousands of such rows and columns of electrowetting elements 402. Electrowetting elements 402 may be similar to or the same as electrowetting elements 300 shown in FIG. 3. Electrowetting elements 402 are electrically connected in the matrix to rows of gate lines G0, G1, G2, G3 . . . , columns of source lines S0, S1, S2, S3 . . . , rows of reset gate lines RG0, RG1, RG2, RG3 . . . , and rows of storage voltage lines Vstore . . . . The gate lines, source lines, reset gate lines, and storage voltage lines are electrically connected to a plurality of conductors (e.g., wires, conductive traces, and so on) represented by lines 404 and 406 in FIG. 4. Electrical signals (e.g., waveforms, voltage levels, and so on) are provided to the gate lines, source lines, reset gate lines, and storage voltage lines by a controller 408 via lines 404 and 406. In particular, storage voltage lines Vstore are electrically tied together and set to the same voltage. Controller 408 may be a processor, a CPU, or an ASIC, just to name a few examples. Functions of controller 408 may be implemented by software, hardware, or both. Controller 408 can affect optical transmission of the electrowetting elements 402 by increasing or decreasing voltage on the source lines and by generating the reset signals, for example.

In particular, individual electrowetting elements 402 are electrically connected to (i) one of the source lines to provide a source signal to a first TFT (e.g., data TFT 306), (ii) one of the gate lines to provide a gate signal to the first TFT, (iii) one of the reset gate lines to provide a switching pulse to a second TFT (e.g., reset TFT 312), and (iv) one of the storage voltage lines to provide a reset voltage to the second TFT.

Figure 5:
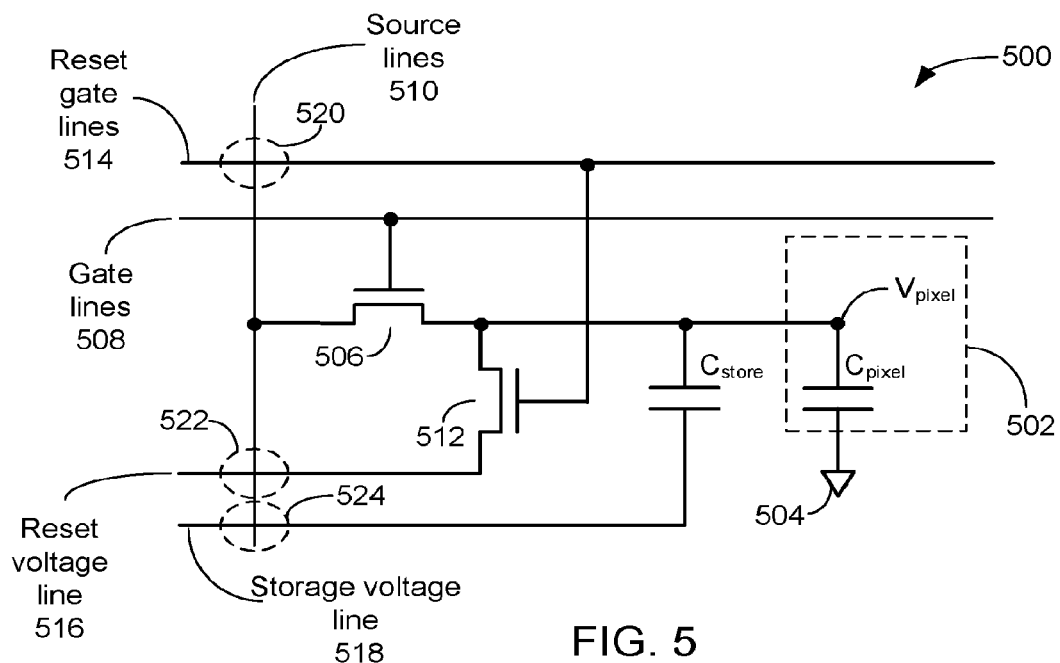
FIG. 5 is a schematic circuit diagram of circuit of an electrowetting element, according to other various embodiments.

FIG. 5 is a schematic circuit diagram of a circuit of an electrowetting element 500 of a display device, according to various embodiments. Electrowetting element 500 is similar to electrowetting element 300, except that electrowetting element 500 includes a separate reset voltage line that provides voltage levels to a pixel and a storage capacitor, as described below. In this fashion, the voltage level on the pixel capacitor and the voltage level on the storage capacitor can be independently controlled. Such independent control can be useful for various implementations of applying reset signals to electrowetting element 500 to reduce or eliminate backflow of a first fluid in the electrowetting element. For example, one benefit of having independent control of the reset voltage is an ability to compensate for kickback of the reset TFT, resulting in true zero voltage across the pixel electrodes during a reset pulse.

Circuit 500 includes a pixel portion 502 that includes the optical portion of electrowetting element 500. Here, referring to the example embodiment shown in FIG. 1, for example, such an optical portion includes first and second fluids 110 and 114 and portions of first and second signal lines 124 and 126. An electrical representation of the optical portion is shown in pixel portion 502. For example, capacitance Cpixel represents a capacitance formed by a multiple dielectric layer stack between two electrodes (e.g., terminations of first and second signal lines 124 and 126) of pixel portion 502. Vpixel is the voltage of pixel portion with respect to common or ground 504. In some implementations, Vpixel is also the voltage of the drain of a data TFT 506, which is used to select electrowetting element 500 from an array of rows and columns of such electrowetting elements.

The display device includes rows of gate lines 508 for selecting particular electrowetting elements and columns of source lines 510 for electrically driving the selected electrowetting elements. Gate lines 508 and source lines 510 may comprise metallic or ITO conductive traces on a support plate (e.g., bottom support plate 104). Gate line 508 is electrically connected to the gate of data TFT 506 to select or deselect electrowetting element 500. Source line 510 is electrically connected to the source of data TFT 506. The drain of TFT 506 is electrically connected to pixel portion 502.

Electrowetting element 500 includes a reset TFT 512 that selectively applies a reset signal (e.g., an electrical pulse) to pixel portion 502. As discussed above, a reset signal may be provided to an electrowetting element, such as pixel portion 502, to reduce or eliminate effects of backflow of a first fluid. The gate of reset TFT 512 is electrically connected to one of a plurality of reset gate lines 514, the source of reset TFT 512 is electrically connected to a reset voltage line 516, and the drain of reset TFT 512 is electrically connected to pixel portion 502. A capacitor $C_{store}$ is electrically connected to storage voltage line 518 and pixel portion 502.

In some embodiments, a reset signal is provided to pixel portion 502 when reset TFT 512 is switched on to connect the voltage on voltage lines 516 to pixel portion 502. The voltage on the gate of reset TFT 512 determines whether reset TFT 512 is switched on or switched off. For example, to provide a reset signal comprising a square pulse to pixel portion 502, reset gate line 514 provides a square pulse to the gate of reset TFT 512. Consequently, reset TFT 512 will be switched on while the square pulse is present at the gate of reset TFT 512 and will be switched off just before and just after this period. While reset TFT 512 is switched on, the voltage on reset voltage line 516 will be electrically connected to pixel portion 502. This process results in a square pulse reset signal that (at least substantially) mimics the square pulse provided to the gate of reset TFT 512. Though both the gate of reset TFT 512 and pixel portion 502 experience a square pulse in the process described above, the square pulse on the gate can have a relatively small magnitude compared to the square pulse delivered to pixel portion 502. The voltage on the gate of reset TFT 512 to open reset TFT 512 corresponds to the voltage on the reset voltage line. For example, if the voltage on the reset voltage line is 13 volts, the voltage on the reset gate line can swing between 8 and 18 V to close or open reset TFT 512. As another example, the square pulse on the gate may have a magnitude (e.g., a peak or high level of the square-shaped pulse) of about 5 volts or less respective to the reset voltage line, while the square pulse delivered to pixel portion 502 through the reset voltage line may have a magnitude of about 15 volts or more.

The voltage "signal" on reset voltage lines 516, is substantially constant (e.g., non-varying magnitude, zero frequency), and by supplying the reset voltage through reset TFT 512 the power consumption is reduced by removing the reset pulse from source line 510.

Similar to the case for the reset voltage lines 516 described above, the voltage "signal" on storage voltage line 518 is substantially constant (e.g., non-varying magnitude, zero frequency), and by supplying the reset voltage through reset TFT 512 the power consumption is reduced by removing the reset pulse from being applied via source line 510. Capacitor $C_{store}$ adds capacitance to the pixel in order to maintain a voltage level during the period when the gate line or the reset gate line of the corresponding pixel is not active and therefore has a "floating" voltage.

Figure 6:
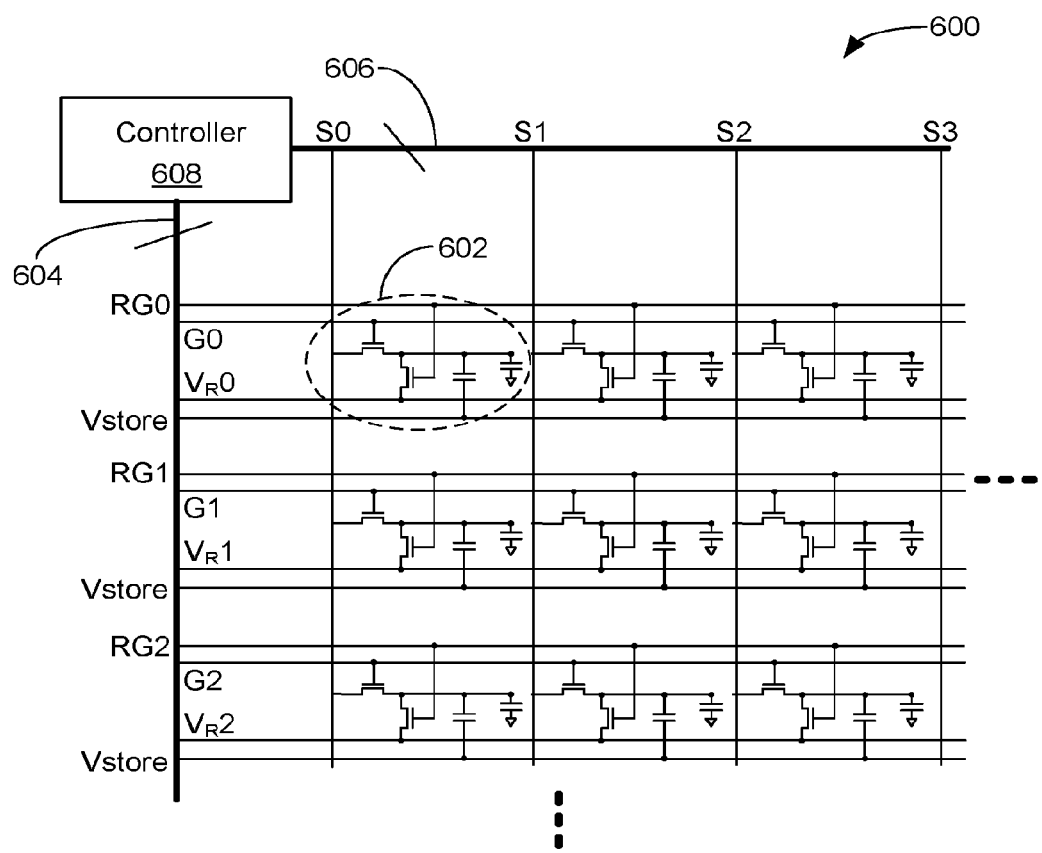
FIG. 6 is a schematic circuit diagram of a portion of an electrowetting element array of an electrowetting device, according to other various embodiments.

FIG. 6 is a schematic circuit diagram of a portion of an electrowetting display device 600, according to various embodiments. Electrowetting display device 600 includes a plurality of electrowetting elements 602 arranged in rows and columns of a matrix. For example, electrowetting display device 600 can include hundreds or thousands of such rows and columns of electrowetting elements 602. Electrowetting elements 602 may be similar to or the same as electrowetting elements 500 shown in FIG. 5. Electrowetting elements 602 are electrically connected in the matrix to rows of gate lines G0, G1, G2 . . . , columns of source lines S0, S1, S2, S3 . . . , rows of reset gate lines RG0, RG1, RG2 . . . , rows of reset voltage lines $V_R0$, $V_R1$, $V_R2$ . . . , and rows of storage voltage lines Vstore. The gate lines, source lines, reset gate lines, reset voltage lines, and storage voltage lines are electrically connected to a plurality of conductors (e.g., wires, conductive traces, and so on) represented by lines 604 and 606 in FIG. 6. Electrical signals (e.g., waveforms, voltage levels, and so on) are provided to the gate lines, source lines, reset gate lines, reset voltage lines and storage voltage lines by a controller 608 via lines 604 and 608. In particular, storage voltage lines Vstore are electrically tied together and set to the same voltage. Also, reset voltage lines $V_R0$, $V_R1$, $V_R2$ . . . , are electrically tied together and set to the same reset voltage, Vreset. Controller 608 may be a processor, a CPU, or an ASIC, just to name a few examples. Functions of controller 608 may be implemented by software, hardware, or both. Controller 608 can affect optical transmission of the electrowetting elements 602 by increasing or decreasing voltage on the source lines and by generating the reset signals, for example.

In particular, individual electrowetting elements 602 are electrically connected to (i) one of the source lines to provide a source signal to a first TFT (e.g., data TFT 506), (ii) one of the gate lines to provide a gate signal to the first TFT, (iii) one of the reset gate lines to provide a switching pulse to a second TFT (e.g., reset TFT 512), (iv) one of the reset voltage lines to provide a reset voltage to the second TFT, and (v) one of the storage voltage lines to provide a storage voltage to a storage capacitor (e.g., $C_{store}$).

Figure 7:
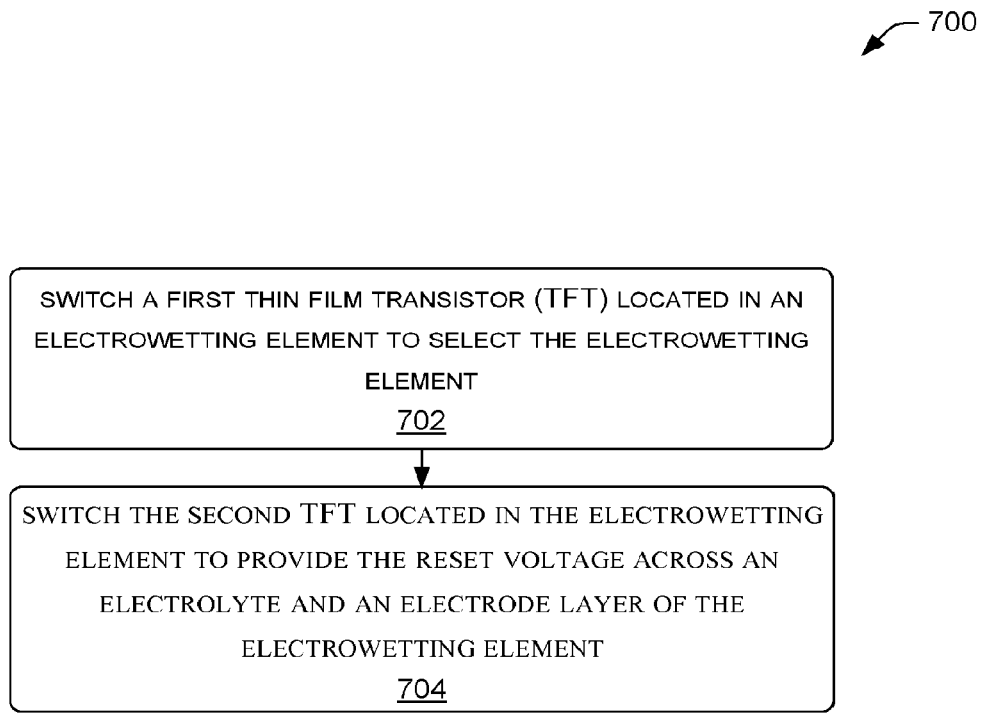
FIG. 7 is a flow diagram of a process for operating an electrowetting display device, according to various example embodiments.

FIG. 7 is a flow diagram of a process 700 for operating an electrowetting display device, according to various example embodiments. For example, such an electrowetting display device may include electrowetting elements such as 300 or 500 shown in FIGS. 3 and 5, respectively. Process 700 may be performed by controllers 408, 608, or one or more processors (e.g., processor(s) 810, shown in FIG. 8), for example.

At block 702, a first TFT located in an electrowetting element is switched "on" to select the electrowetting element. For example, the gate of the first TFT (e.g., data TFT 306 or 506 shown in FIGS. 3 and 5, respectively) can be set from ground voltage to a relatively high (e.g., about 5 volts) voltage to place the first TFT in a conductive state.

At block 704, the second TFT located in the electrowetting element is switched "on" to provide the reset voltage across an electrolyte and an electrode layer of the electrowetting element. For example, the second TFT may be switched on by providing a reset gate signal to the gate of the second TFT. The electrolyte and the electrode layer may be the same or similar to second fluid 114 and electrode layer 102 shown in the example embodiment in FIG. 1, though claimed subject matter is not limited in this respect.

Figure 8:
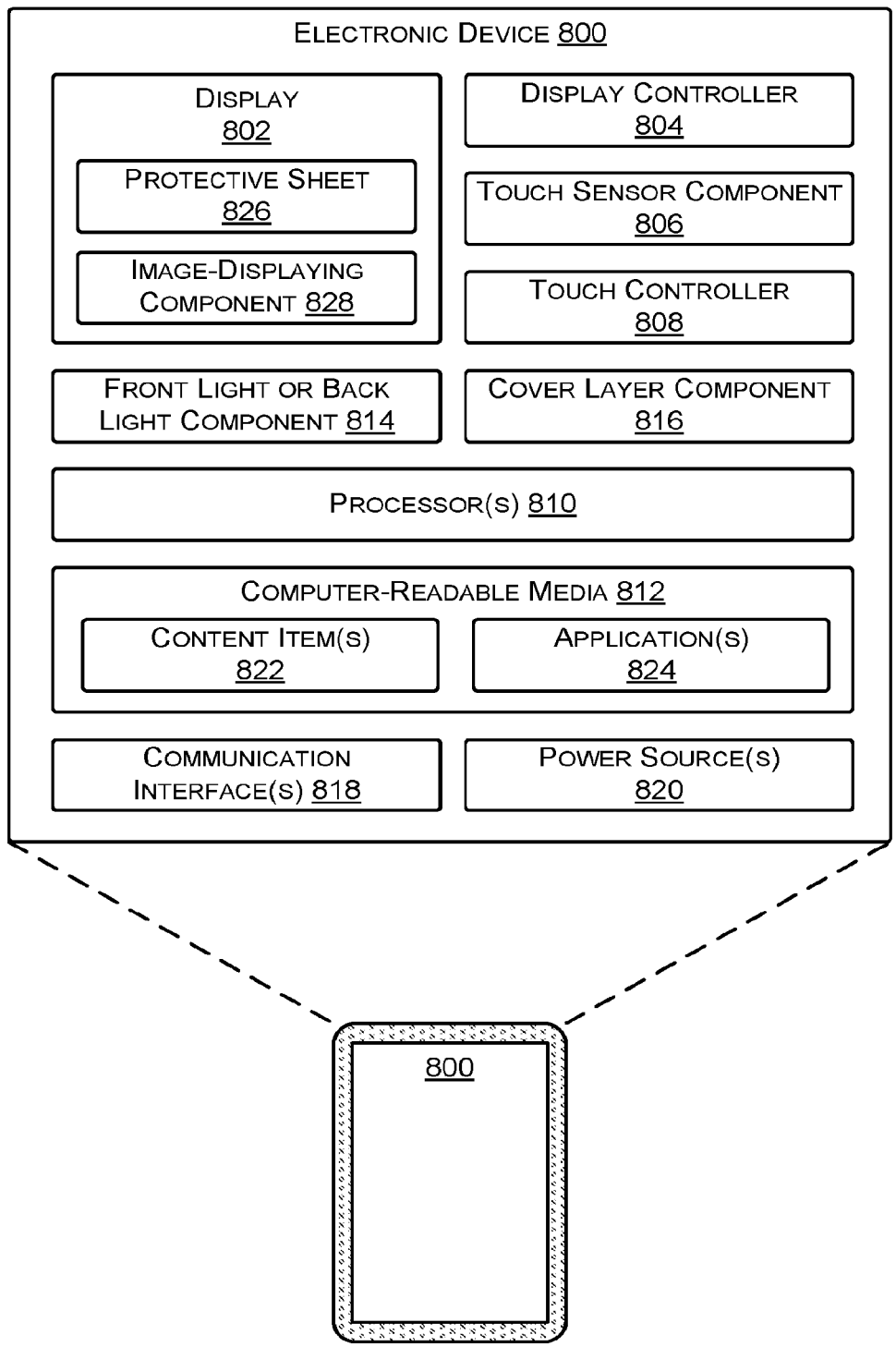
FIG. 8 illustrates an example electronic device equipped with a display device, according to some embodiments.

FIG. 8 illustrates an example electronic device 800 that may incorporate any of the display devices discussed above. The device 800 may comprise any type of electronic device having a display. For instance, the device 800 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 800 may be a non-mobile electronic device (e.g., a computer display, a television, etc.). In addition, while FIG. 8 illustrates several example components of the electronic device 800, it is to be appreciated that the device 800 may also include other conventional components, such as an operating system, system busses, input/output components, and the like. Further, in other examples, such as in the case of a television or computer monitor, the electronic device 800 may only include a subset of the components shown.

Regardless of the specific implementation of the electronic device 800, the device 800 includes a display 802 and a corresponding display controller 804. The display 802 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 802 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 800, the display 802 may be an active display such as a liquid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a liquid in relation to a surface. For example, such an electrowetting display may include electrowetting elements 300 or 500, shown in FIGS. 3 and 5, respectively. Such electrowetting elements may be incorporated in an electrowetting display in configurations such as those shown in FIGS. 4 and 6, though claimed subject matter is not limited in this respect. By applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 802 may represent a backlit display, examples of which are mentioned above.

In addition to including the display 802, FIG. 8 illustrates that some examples of the device 800 may include a touch sensor component 806 and a touch controller 808. In some instances, at least one touch sensor component 806 resides with, or is stacked on, the display 802 to form a touch-sensitive display (e.g., an electronic paper touch-sensitive display). Thus, the display 802 may be capable of both accepting user touch input and rendering content in response to or corresponding to the touch input. As several examples, the touch sensor component 806 may comprise a capacitive touch sensor, a force sensitive resistance (FSR), an interpolating force sensitive resistance (IFSR) sensor, or any other type of touch sensor. In some instances, the touch sensor component 806 is capable of detecting touches as well as determining an amount of pressure or force of these touches.

FIG. 8 further illustrates that the electronic device 800 may include one or more processors 810 and one or more computer-readable media 812, as well as a front light component 814 (which may alternatively be a backlight component in the case of a backlit display) for lighting the display 802, a cover layer component 816, such as a cover glass or cover sheet, one or more communication interfaces 818 and one or more power sources 820. The communication interfaces 818 may support both wired and wireless connection to various networks, such as cellular networks, radio, WiFi networks, short range networks (e.g., Bluetooth®), infrared (IR), and so forth. In some implementations, one or more processors are the same or similar to controller 408, shown in FIG. 4. In such implementations, one or more processors 810 can include a device to measure voltage, for example.

Depending on the configuration of the electronic device 800, the computer-readable media 812 (and other computer-readable media described throughout) is an example of computer storage media and may include volatile and non-volatile memory. Thus, the computer-readable media 812 may include, but is not limited to, RAM, ROM, EEPROM, flash memory, or other memory technology, or any other medium that can be used to store computer-readable instructions, programs, applications, media items, and/or data which can be accessed by the electronic device 800.

The computer-readable media 812 may be used to store any number of functional components that are executable on the processor 810, as well as content items 822 and applications 824. Thus, the computer-readable media 812 may include an operating system and a storage database to store one or more content items 822, such as eBooks, audio books, songs, videos, still images, and the like. The computer-readable media 812 of the electronic device 800 may also store one or more content presentation applications to render content items on the device 800. These content presentation applications may be implemented as various applications 824 depending upon the content items 822. For instance, the content presentation application may be an electronic book reader application for rending textual electronic books, an audio player for playing audio books or songs, a video player for playing video, and so forth.

In some instances, the electronic device 800 may couple to a cover (not shown in FIG. 8) to protect the display (and other components in the display stack or display assembly) of the device 800. In one example, the cover may include a back flap that covers a back portion of the device 800 and a front flap that covers the display 802 and the other components in the stack. The device 800 and/or the cover may include a sensor (e.g., a Hall effect sensor) to detect when the cover is open (i.e., when the front flap is not atop the display and other components). The sensor may send a signal to the front light component 814 when the cover is open and, in response, the front light component 814 may illuminate the display 802. When the cover is closed, meanwhile, the front light component 814 may receive a signal indicating that the cover has closed and, in response, the front light component 814 may turn off.

Furthermore, the amount of light emitted by the front light component 814 may vary. For instance, upon a user opening the cover, the light from the front light may gradually increase to its full illumination. In some instances, the device 800 includes an ambient light sensor (not shown in FIG. 8) and the amount of illumination of the front light component 814 may be based at least in part on the amount of ambient light detected by the ambient light sensor. For example, the front light component 814 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 802 may vary depending on whether the front light component 814 is on or off, or based on the amount of light provided by the front light component 814. For instance, the electronic device 800 may implement a larger default font or a greater contrast when the light is off compared to when the light is on. In some instances, the electronic device 800 maintains, when the light is on, a contrast ratio for the display that is within a certain defined percentage of the contrast ratio when the light is off.

As described above, the touch sensor component 806 may comprise a capacitive touch sensor that resides atop the display 802. In some examples, the touch sensor component 806 may be formed on or integrated with the cover layer component 816. In other examples, the touch sensor component 806 may be a separate component in the stack of the display assembly. The front light component 814 may reside atop or below the touch sensor component 806. In some instances, either the touch sensor component 806 or the front light component 814 is coupled to a top surface of a protective sheet 826 of the display 802. As one example, the front light component 814 may include a lightguide sheet and a light source (not shown in FIG. 8). The lightguide sheet may comprise a substrate (e.g., a transparent thermoplastic such as PMMA or other acrylic), a layer of lacquer and multiple grating elements formed in the layer of lacquer that function to propagate light from the light source towards the display 802, thus illuminating the display 802.

The cover layer component 816 may include a transparent substrate or sheet having an outer layer that functions to reduce at least one of glare or reflection of ambient light incident on the electronic device 800. In some instances, the cover layer component 816 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3$h$ pencil). Without such scratch resistance, a device may be more easily scratched and a user may perceive the scratches from the light that is dispersed over the top of the reflective display. In some examples, the protective sheet 826 may include a similar UV-cured hard coating on the outer surface. The cover layer component 816 may couple to another component or to the protective sheet 826 of the display 802. The cover layer component 816 may, in some instances, also include a UV filter, a UV-absorbing dye, or the like, for protecting components lower in the stack from UV light incident on the electronic device 800. In still other examples, the cover layer component 816 may include a sheet of high-strength glass having an antiglare and/or antireflective coating.

The display 802 includes the protective sheet 826 overlying an image-displaying component 828. For example, the display 802 may be preassembled to have the protective sheet 826 as an outer surface on the upper or image-viewing side of the display 802. Accordingly, the protective sheet 826 may be integral with and may overlie the image-displaying component 828. The protective sheet 826 may be optically transparent to enable a user to view, through the protective sheet 826, an image presented on the image-displaying component 828 of the display 802.

In some examples, the protective sheet 826 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 126 may include a coating, such as the hard coating described above. For instance, the hard coating may be applied to the outer surface of the protective sheet 826 before or after assembly of the protective sheet 826 with the image-displaying component 828 of the display 802. In some examples, the hard coating may include a photoinitiator or other reactive species in its composition, such as for curing the hard coating on the protective sheet 826. Furthermore, in some examples, the protective sheet 826 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 826, thereby protecting the image-displaying component 828 from UV light.

According to some implementations herein, one or more of the components discussed above may be coupled to the display 802 using liquid optically-clear adhesive (LOCA). For example, suppose that the light guide portion of the front light component 814 is to be coupled to the display 802. The light guide may be coupled to the display 802 by placing the LOCA on the outer or upper surface of the protective sheet 826. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 814 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 814. In other implementations, the LOCA may be placed near a center of the protective sheet 826, and pressed outwards towards a perimeter of the top surface of the protective sheet 126 by placing the front light component 814 on top of the LOCA. The LOCA may then be cured by directing UV light through the front light component 814. As discussed above, and as discussed additionally below, various techniques, such as surface treatment of the protective sheet, may be used to prevent discoloration of the LOCA and/or the protective sheet 826.

While FIG. 8 illustrates a few example components, the electronic device 800 may have additional features or functionality. For example, the device 800 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 800 may reside remotely from the device 800 in some implementations. In these implementations, the device 800 may utilize the communication interfaces 818 to communicate with and utilize this functionality.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device comprising:
rows and columns of electrowetting elements that form an active matrix to display a pixelated image, wherein each of the electrowetting elements includes:
a portion of a support plate;
a bottom electrode and a hydrophobic layer on the support plate;
an electrowetting oil and an electrolyte on the hydrophobic layer, wherein the electrowetting oil is immiscible with the electrolyte, and wherein the bottom electrode and the electrolyte form a portion of a circuit;
a top electrode in electrical contact with the electrolyte, wherein the bottom electrode, the top electrode and the electrolyte form a portion of a circuit;
a first thin film transistor (TFT) that is switched on to select each of the electrowetting elements using active matrix addressing;
a second TFT that is switched on to provide a reset pulse to the portion of the circuit; and
a capacitor electrically connected in parallel with the second TFT;
a plurality of source lines each electrically connected to one of (i) a source or (ii) a drain of the first TFTs of each of the electrowetting elements; and
a plurality of gate lines each electrically connected to a gate of the first TFT of each of the electrowetting elements:
wherein each of the electrowetting elements is electrically connected to:
a reset voltage line to provide a first reset voltage to the capacitor; and
a storage voltage line to provide a second reset voltage to the second TFT.

2. The electrowetting display device of claim 1, wherein each of the electrowetting elements is electrically connected to:
a respective one of the source lines to provide a source signal to the first TFT;
a respective one of the gate lines to provide a gate signal to the first TFT; and
a reset gate line to provide a switching pulse to the second TFT; and
wherein the reset pulse is based, at least in part, on a storage voltage provided to (i) the second TFT and (ii) the capacitor.

3. The electrowetting display device of claim 2, wherein the source lines, the gate lines, the reset gate line and the storage voltage line comprise metallic or tin-doped indium-oxide (ITO) conductive traces on the support plate.

4. The electrowetting display device of claim 1, wherein each of the electrowetting elements is electrically connected to:
a respective one of the source lines to provide a source signal to the first TFT;
a respective one of the gate lines to provide a gate signal to the first TFT; and
a reset gate line to provide a switching pulse to the second TFT;
and wherein the reset pulse is based, at least in part, on (i) the first reset voltage and (ii) the second reset voltage.

5. An electrowetting display device comprising:
rows and columns of electrowetting elements, wherein each of the electrowetting elements includes:
an electrode;
a fluid adjacent to and in electrical contact with the electrode;

a first thin film transistor (TFT) that is switched on to select each of the electrowetting elements using active matrix addressing;

a second TFT that is switched on to provide a reset signal to the electrode; and a capacitor electrically connected in parallel with the second TFT;

a plurality of source lines each electrically connected to one of (i) a source or (ii) a drain of the first TFT of each of the respective electrowetting elements;

a plurality of gate lines each electrically connected to a gate of the respective first TFT of each of the electrowetting elements;

a reset voltage line electrically connected to the second TFT; and a storage voltage line electrically connected to the capacitor.

6. The electrowetting display device of claim 5, wherein the electrode is a first electrode and the fluid is a first fluid, and wherein each of the electrowetting elements further includes:

a second fluid immiscible with the first fluid; and a second electrode in electrical contact with the second fluid, wherein the second electrode, the second fluid and the first electrode form a portion of an electrical circuit that includes the first TFT and the second TFT.

7. The electrowetting display device of claim 6, wherein the first fluid is an electrowetting oil and the second fluid is an electrolyte.

8. The electrowetting display device of claim 5, further comprising reset gate lines, wherein each of the reset gate lines is electrically connected to a gate of each of the respective second TFTs of the electrowetting elements.

9. The electrowetting display device of claim 8, wherein the reset gate lines cross the source lines to form capacitive coupling among the reset gate lines and the source lines.

10. The electrowetting display device of claim 5, wherein the storage voltage line crosses the source lines to form capacitive coupling among the storage voltage line and the source lines.

11. The electrowetting display device of claim 5, wherein (i) the storage voltage line and (ii) the reset voltage line cross the source lines to form capacitive coupling among the storage voltage line, the reset voltage line and the source lines.

12. The electrowetting display device of claim 5, further comprising:

a control circuit to affect optical transmission of the electrowetting elements by (i) increasing or decreasing voltage on the source lines and by generating the reset signal.

13. A method for operating an electrowetting display device, the method comprising:

switching on a first thin film transistor (TFT) located in an electrowetting element to select the electrowetting element;

providing, via a reset voltage line, a reset voltage to a second TFT located in the electrowetting element by switching on the second TFT to provide the reset voltage across (i) an electrolyte and (ii) an electrode of the electrowetting element; and providing, via a storage voltage line, a storage voltage to a capacitor electrically connected in parallel with the second TFT.

14. The method of claim 13, wherein switching on the second TFT to provide the reset voltage comprises:

providing a reset gate signal via a reset gate line to a gate of the second TFT.

15. The method of claim 13, wherein the reset voltage is substantially constant during the switching on of the first TFT and the switching on of the second TFT.

* * * * *